United States Patent
Wendland

(10) Patent No.: US 9,919,305 B2
(45) Date of Patent: *Mar. 20, 2018

(54) SULFONYL-CONTAINING POLYMERIC MATERIAL WITH RIGID AND CONTORTED DIVINYL CROSSLINKER

(71) Applicant: 3M INNOVATIVE PROPERTIES COMPANY, St. Paul, MN (US)

(72) Inventor: Michael S. Wendland, North St. Paul, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/889,617

(22) PCT Filed: Apr. 25, 2014

(86) PCT No.: PCT/US2014/035389
§ 371 (c)(1),
(2) Date: Nov. 6, 2015

(87) PCT Pub. No.: WO2014/186108
PCT Pub. Date: Nov. 20, 2014

(65) Prior Publication Data
US 2016/0082429 A1    Mar. 24, 2016

Related U.S. Application Data

(60) Provisional application No. 61/823,155, filed on May 14, 2013.

(51) Int. Cl.
| | | |
|---|---|---|
| C07C 13/72 | (2006.01) | |
| C07C 35/44 | (2006.01) | |
| B01J 39/20 | (2006.01) | |
| C08F 212/08 | (2006.01) | |
| C08F 8/36 | (2006.01) | |
| B01J 39/26 | (2006.01) | |
| B01J 41/14 | (2006.01) | |
| B01J 41/20 | (2006.01) | |

(52) U.S. Cl.
CPC ............ *B01J 39/20* (2013.01); *B01J 39/26* (2013.01); *B01J 41/14* (2013.01); *B01J 41/20* (2013.01); *C08F 8/36* (2013.01); *C08F 212/08* (2013.01); *C08F 2800/10* (2013.01)

(58) Field of Classification Search
USPC ............................................ 544/230; 546/15
See application file for complete search history.

(56) References Cited

U.S. PATENT DOCUMENTS

| | | | |
|---|---|---|---|
| 3,945,968 A | 3/1976 | Goletto | |
| 6,080,833 A | * 6/2000 | Otsuji | ............... C08F 222/1006 528/196 |
| 7,690,514 B2 | 4/2010 | McKeown | |
| 9,056,823 B2 | * 6/2015 | Li | ............... B01J 37/0036 |
| 9,139,674 B2 | * 9/2015 | Wendland | ............... B01J 20/267 |
| 9,296,668 B2 | * 3/2016 | Wendland | ............... C07C 13/72 |
| 2005/0256308 A1 | 11/2005 | Watanabe | |

FOREIGN PATENT DOCUMENTS

| | | |
|---|---|---|
| DE | 3434286 | 5/1985 |
| JP | 2000-119420 | 4/2000 |
| WO | 2005/012397 | 2/2005 |
| WO | 2014/186094 | 11/2014 |
| WO | 2014/186095 | 11/2014 |

OTHER PUBLICATIONS

Ma, Xiaohua et al. "Synthesis and Gas Transport Properties of Hydroxyl-Functionalized Polyimides with Intrinsic Microporosity", Macromolecules, vol. 45, No. 9, May 8, 2012, pp. 3841-3849.*
Budd, "Polymers of intrinsic microporosity (PIMs): robust, solution-processable, organic nonporous materials", Chemical Communications, 2004, pp. 230-231.
Carta, "Novel Spirobisindanes for Use as Precursors to Polymers of Intrinsic Microporosity", Organic Letters, 2008, vol. 10, No. 13, pp. 2641-2643.
Ezzeldin, "Synthesis and Properties of Anion Exchangers Derived from Chloromethyl Styrene Codivinylbenzene and Their Use in Water Treatment", International Journal of Polymer Science, 2010, vol. 2010, 9 pages.
Liu, "Efficient and stable solid acid catalysts synthesized from sulfonation of swelling mesoporous polydivinylbenzenes", Journal of Catalysis, 2010, vol. 271, pp. 52-58, XP26980665.
Pepper, "Sulphonated Cross-Linked Polystyrene: A Monofunctional Cation-Exchange Resin", Journal of Applied Chemistry, 1951, vol. 1, No. 3, pp. 124-132.
International Search Report for PCT International Application No. PCT/US2014/035389, dated Aug. 25, 2014, 3 pages.

* cited by examiner

*Primary Examiner* — Mark Kaucher
*Assistant Examiner* — Henry Hu
(74) *Attorney, Agent, or Firm* — Jean A. Lown

(57) ABSTRACT

Sulfonyl-containing polymeric materials are prepared by treating a precursor polymeric material with a sulfonyl-containing compound. The precursor polymeric materials are formed from a polymerizable composition that contains a crosslinker that is a free-radically polymerizable spirobisindane monomer. The sulfonyl-containing polymeric material can be used as an ion exchange resin.

14 Claims, No Drawings

SULFONYL-CONTAINING POLYMERIC MATERIAL WITH RIGID AND CONTORTED DIVINYL CROSSLINKER

CROSS REFERENCE TO RELATED APPLICATIONS

This application is a national stage filing under 35 U.S.C. 371 of PCT/US2014/035389, filed Apr. 25, 2014, which claims priority to U.S. Provisional Application No. 61/823,155, filed May 14, 2013, the disclosure of which is incorporated by reference in its/their entirety herein.

TECHNICAL FIELD

Polymeric materials prepared using free-radically polymerizable spirobisindane monomers as crosslinkers are functionalized to provide a sulfonyl-containing group. The sulfonyl-containing polymeric materials, which can be used as ion exchange resins, and the methods of making the sulfonyl-containing polymeric materials are described.

BACKGROUND

Ion exchange resins used in high pressure chromatography columns are desired that can withstand the relatively high pressures and/or high temperatures typically encountered. Higher pressures can often impart greater separation power. Such ion exchange resins are usually crosslinked to provide resilience to deformation or fracture under high pressure and/or high temperature conditions. For example, many commercially available ion exchange resins for high pressure separations are based on divinylbenzene cross-linked polystyrene that are functionalized to provide ionic groups. Such materials are described, for example, in Pepper, *J. Appl. Chem.*, 1951, 1, 124.

Polymeric materials have been prepared using spirobisindane-containing materials. For example, Reaction Scheme A shows the reaction of 5,5',6,6'-tetrahydroxy-3,3,3',3'-tetramethyl-1,1'-spirobisindane with 2,3,5,6-tetrafluoroterephthalonitrile to form a polymeric material with fused dioxin rings as linking groups. These polymers and their synthesis methods are described more fully, for example, in Budd et al., *Chem. Commun.*, 2004, 230 and in U.S. Pat. No. 7,690,514 (McKeown et al.).

Reaction Scheme A

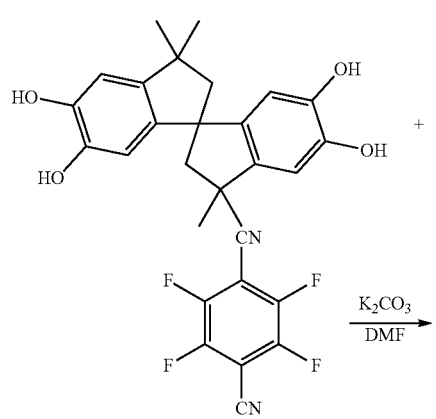

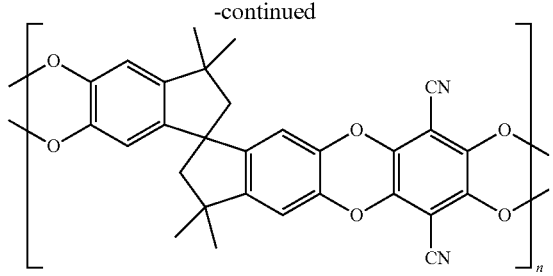

The polymerization times tend to be lengthy (e.g., several days) and the monomers used to form the polymers are often quite expensive.

SUMMARY

Sulfonyl-containing polymeric materials and methods of making these materials are provided. More specifically, the sulfonyl-containing polymeric materials are prepared by treating a precursor polymeric material with a sulfonyl-containing compound. The precursor polymeric materials are formed from a polymerizable composition that contains a rigid and contorted divinyl crosslinker. The sulfonyl-containing polymeric materials can be used as ion exchange resins. These ion exchange resins can have higher glass transition temperatures, and/or greater resistance to compression, and/or improved thermal stability than comparable polymeric materials prepared using common crosslinkers such as divinylbenzene.

In a first aspect, a sulfonyl-containing polymeric material is provided that includes a reaction product of a reaction mixture containing a) a precursor polymeric material and b) a sulfonyl-containing compound. The precursor material includes the polymerized product of a polymerizable composition containing i) a monomer mixture and ii) a free radical initiator. The monomer mixture contains 1) a first monomer of Formula (I)

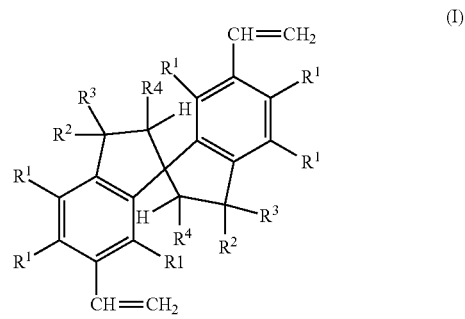

and 2) a second monomer that is styrene, styrene substituted with one or more alkyl groups, or a combination thereof, wherein the first monomer of Formula (I) is present in an amount up to 25 mole percent based on moles of the second monomer. In the monomer of Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond. The sulfonyl-containing polymeric material has at least one group of formula —$SO_2R^5$ and up to a maximum of one group of formula —$SO_2R^5$ for each aromatic ring in the sulfonyl-containing polymeric material. The group $R^5$ is —OH, —$NH_2$, or —$NR^6$-Q-N$(R^6)_2$. The group Q is a single bond, alkylene, or a group of formula -$(Q^1$-$NR^6)_x$-$Q^2$- where each $Q^1$ and $Q^2$ is independently an alkylene and where x is an integer in a range of 1 to 4. Each group $R^6$ is independently hydrogen or alkyl.

In a second aspect, a method of making a sulfonyl-containing polymeric material is provided. The method includes preparing a polymerizable composition containing a) a monomer mixture and b) a free radical initiator. The monomer mixture contains i) a first monomer of Formula (I) and ii) a second monomer that is styrene, styrene substituted with one or more alkyl groups, or a combination thereof. The first monomer of Formula (I) is the same as described above and is present in an amount up to 25 mole percent based on moles of the second monomer. The method further includes forming a precursor polymeric material by reacting the polymerizable composition and then treating the precursor polymeric material with a sulfonyl-containing compound to form a sulfonyl-containing polymeric material. The sulfonyl-containing polymeric material has at least one group of formula —$SO_2R^5$ and up to a maximum of one group of formula —$SO_2R^5$ for each aromatic ring in the sulfonyl-containing polymeric material. The group $R^5$ is the same as defined above.

DETAILED DESCRIPTION

Sulfonyl-containing polymeric materials are prepared by treating a precursor polymeric material with a sulfonyl-containing compound. The precursor polymeric materials are formed from a polymerizable composition that contains a crosslinker that is a free-radically polymerizable spirobisindane monomer. The sulfonyl-containing polymeric material can be used, for example, as an ion exchange resin.

The terms "a", "an", and "the" are used interchangeably with "at least one" to mean one or more of the elements being described.

The term "halo" refers to a monovalent group that is a radical of a halogen atom. The halo can be fluoro, chloro, bromo, or iodo.

The term "alkyl" refers to a monovalent group that is a radical of an alkane. The alkyl group can have 1 to 20 carbon atoms and can be linear, branched, cyclic, or a combination thereof. When the alkyl is linear, it can have 1 to 20 carbon atoms. When the alkyl is branched or cyclic, it can have 3 to 20 carbon atoms.

The term "alkoxy" refers to a monovalent group of formula —OR where R is an alkyl as defined above.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms.

The term "alkaryl" refers to an aryl group substituted with at least one alkyl group. The alkaryl group contains 6 to 40 carbon atoms. The alkaryl group often contains an aryl group having 5 to 20 carbon atoms and an alkyl group having 1 to 20 carbon atoms.

The term "aralkyl" refers to an alkyl group substituted with at least one aryl group. The aralkyl group contains 6 to 40 carbon atoms. The aralkyl group often contains an alkyl group having 1 to 20 carbon atoms and an aryl group having 5 to 20 carbon atoms.

The term "carbocyclic group" refers to an aliphatic or aromatic carbon ring structure. The carbocyclic group can be saturated, partially unsaturated, or unsaturated. The carbocyclic group often contains 5 to 20 carbon atoms.

The term "polymer" refers to both polymeric materials prepared from one monomer such as a homopolymer or to polymeric materials prepared from two or more monomers such as a copolymer, terpolymer, or the like. Likewise, the term "polymerize" refers to the process of making a polymeric material that can be a homopolymer, copolymer, terpolymer, or the like.

In a first aspect, a sulfonyl-containing polymeric material is provided that includes a reaction product of a reaction mixture containing a) a precursor polymeric material and b) a sulfonyl-containing compound. The precursor material includes the polymerized product of a polymerizable composition that contains a monomer mixture and a free radical initiator. The monomer mixture contains a first monomer that is a spirobisindane monomer having two free radically polymerizable groups and a second monomer that is styrene, styrene substituted with one or more alkyl groups, or a combination thereof. The first monomer is present in an amount up to 25 mole percent based on moles of the second monomer in the monomer mixture. The sulfonyl-containing polymeric material contains at least one sulfonyl-containing group and up to a maximum of one sulfonyl-containing group per aromatic ring.

The spirobisindane monomer having two free radically polymerizable groups is a crosslinker of Formula (I). The two free radically polymerizable groups are vinyl groups.

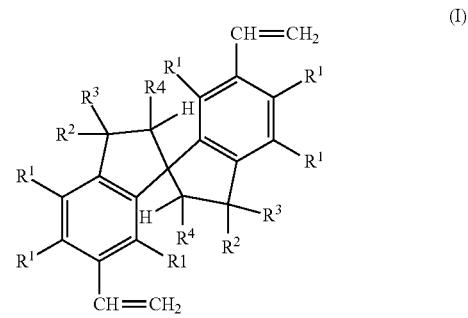

(I)

In the first monomer of Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond.

Each $R^1$ in Formula (I) is hydrogen, halo, alkyl, aryl, alkaryl, or aralkyl. Suitable halo groups for $R^1$ include, but are not limited to, chloro and bromo. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl.

At least one $R^1$ is hydrogen in the monomer of Formula (I). In some embodiments, there is at least one $R^1$ equal to hydrogen on each aromatic ring shown in Formula (I). That is, there are at least two $R^1$ groups equal to hydrogen in the monomer of Formula (I). This is often the position that undergoes a reaction with the sulfonyl-containing compound to introduce a group of formula $-SO_2R^5$ into the precursor polymeric material during the formation of the sulfonyl-containing polymeric material. That is, the final sulfonyl-containing polymeric material, one of the $R^1$ groups equal to hydrogen in the monomer of Formula (I) and the corresponding precursor polymeric material is replaced with a sulfonyl-containing group of formula $-SO_2R^5$.

Each $R^2$ in Formula (I) is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl.

Suitable cyclic alkyl groups that form through the combination of $R^2$ and $R^3$ can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of fluorene).

Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl. Suitable cyclic alkyl groups that form through the combination of $R^2$ and $R^3$ can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of fluorene).

Each $R^4$ is independently hydrogen or combines with $R^3$ connected to an adjacent carbon atom to form a carbon-carbon bond.

In some specific embodiments of the monomer of Formula (I), $R^1$ is hydrogen or halo, $R^2$ is an alkyl having 1 to 10 carbon atoms (e.g., 1 to 6 carbon atoms, 1 to 4 carbon atoms, 1 to 3 carbon atoms, or 1 carbon atom), $R^3$ is an alkyl having 1 to 10 carbon atoms (e.g., 1 to 6 carbon atoms, 1 to 4 carbon atoms, 1 to 3 carbon atoms, or 1 carbon atom), and $R^4$ is hydrogen. In other more specific embodiments of the monomer of Formula (I), each $R^1$ is hydrogen, $R^2$ is an alkyl having 1 to 6 carbon atoms (e.g., 1 to 4 carbon atoms, 1 to 3 carbon atoms, or 1 carbon atom), $R^3$ is an alkyl having 1 to 6 carbon atoms (e.g., 1 to 4 carbon atoms, 1 to 3 carbon atoms, or 1 carbon atom), and $R^4$ is hydrogen. In an even more specific embodiment of the monomer of Formula (I), each $R^1$ is hydrogen, $R^2$ is methyl, $R^3$ is methyl, and $R^4$ is hydrogen; this monomer is 3,3,3',3'-tetramethyl-1,1'-spirobisindan-6,6'-divinyl.

The monomers of Formula (I) can be prepared using any known method. For example, monomers can be prepared as shown in Reaction Scheme B where $R^1$ and $R^4$ are hydrogen and where $R^2$ and $R^3$ are alkyl or hydrogen.

Reaction Scheme B

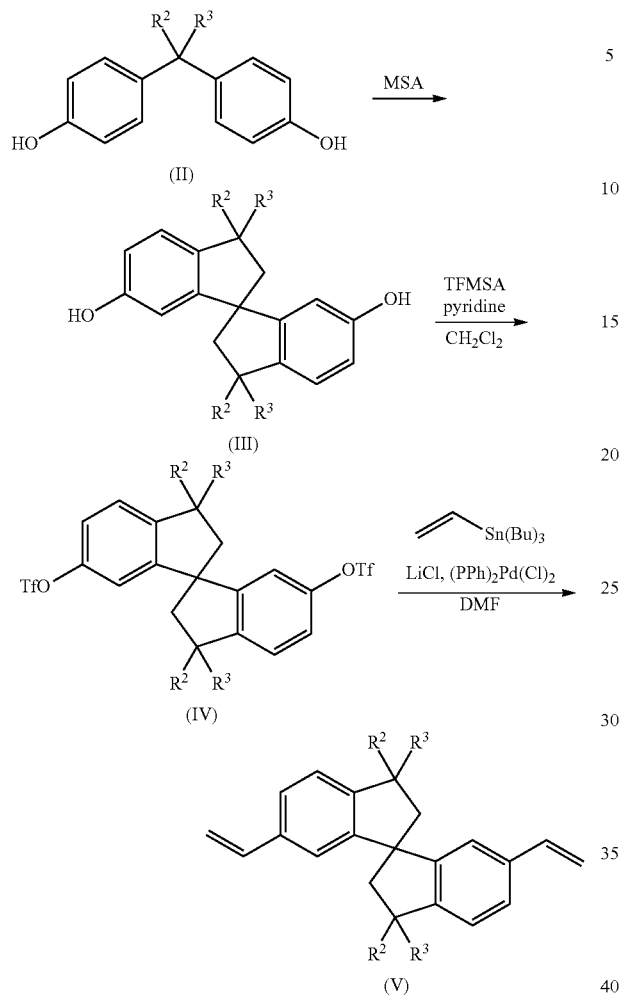

Reaction Scheme C

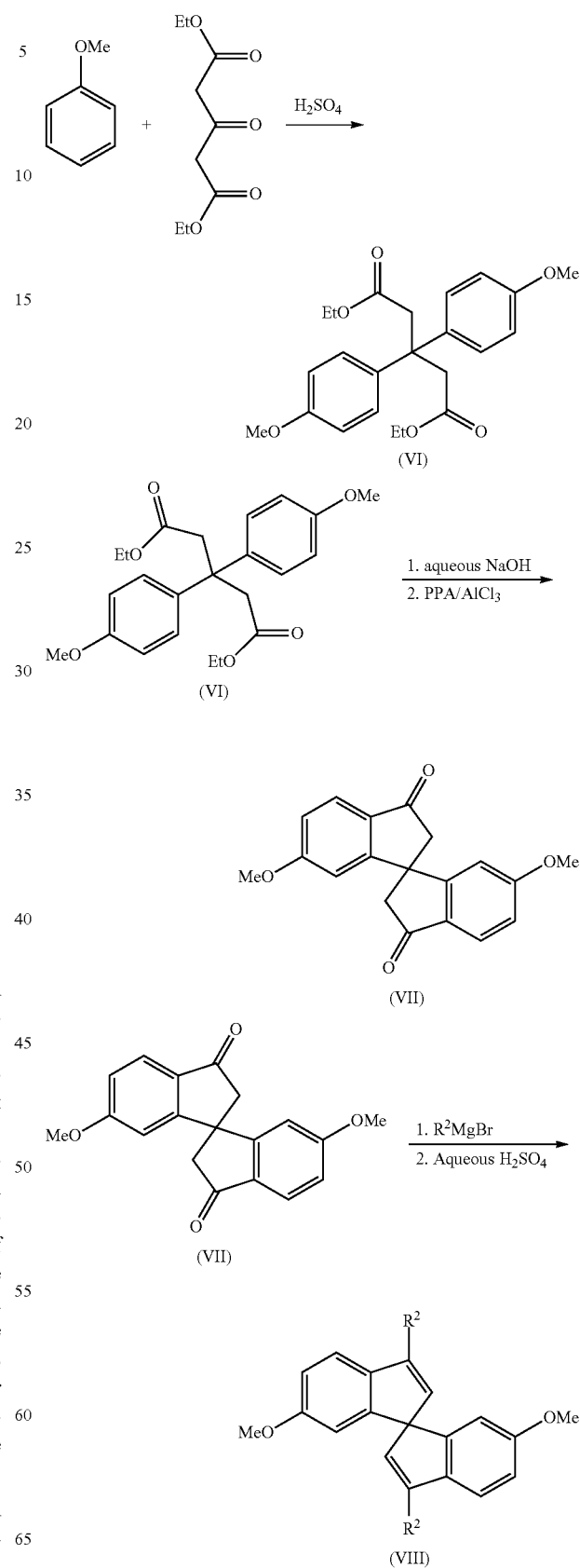

A bisphenol compound of Formula (II) is reacted with methane sulfonic acid (MSA) to produce the spirobisindan-6,6'-diol compound of Formula (III). The spirobisindan-6,6'-diol can be reacted with trifluoromethane sulfonic anhydride (TFMSA) in the presence of pyridine and a solvent such as methylene chloride to produce the spirobisindan-6,6'-bistriflate compound of Formula (IV). The spirobisindan-6,6'-bistriflate compound can subsequently be subjected to a Stille coupling reaction to produce the spirobisindane-6,6'-divinyl compound of Formula (V). That is, the compound of Formula (IV) can be reacted with tributyl(vinyl) tin in the presence of lithium chloride, a palladium catalyst, and a solvent such as dimethyl formamide (DMF) to introduce polymerizable groups. The details for this synthesis approach are further described in the Example section for the preparation of the monomer 3,3,3',3'-tetramethyl-1,1'-spirobisindan-6,6'-divinyl starting from bisphenol A as the compound of Formula (II).

Monomers of Formula (I) can be prepared as shown in Reaction Scheme C where $R^3$ and $R^4$ combine to form a carbon-carbon double bond and where $R^2$ is an alkyl, aryl, alkaryl, or aralkyl.

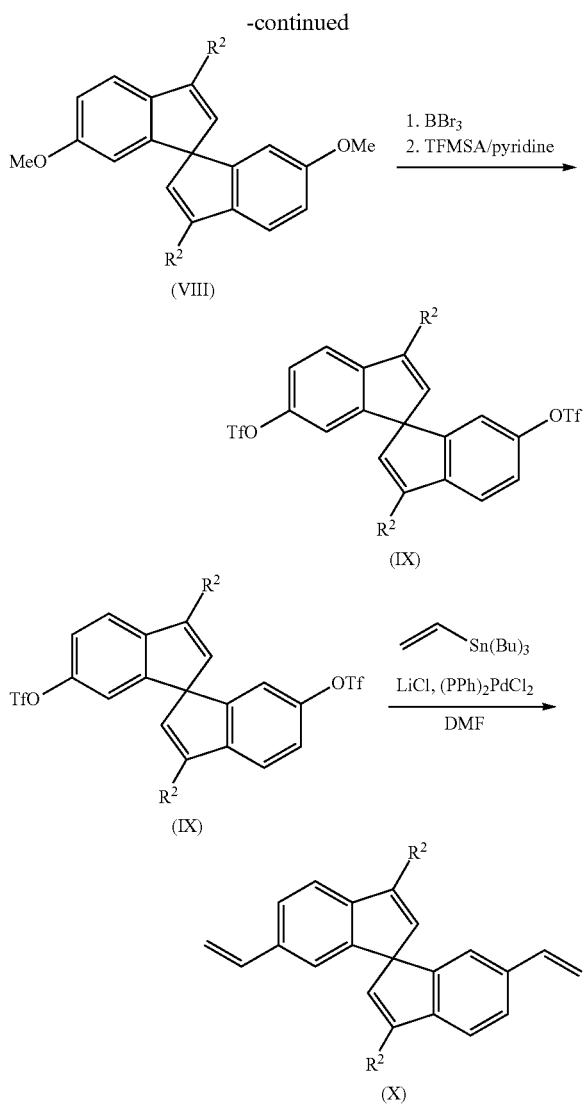

The chemistry involved in the formation of the dione (Compound (VII)) is described in *Org. Lett.*, 2008, 10, 2641. More specifically, diethyl-1,3-acetonedicarboxylate and methoxybenzene are reacted in the presence of sulfuric acid to form Compound (VI). This reaction is followed by hydrolysis and then Friedel-Crafts acylation mediated by polyphosphoric acid (PPA) and aluminum trichloride ($AlCl_3$) to form Compound (VII). Various monomers of Formula (I) can be prepared from the dione (Compound (VII)) using Grignard reactions. This type of reaction is exemplified in Reaction Scheme C using $R^2MgBr$ as the Grignard reagent. The dehydrated spirobisindane (Compound (VIII)) is formed after treatment with aqueous sulfuric acid. Compound (VIII) is reacted with boron tribromide ($BBr_3$) to convert the methoxy groups to hydroxyl groups. The hydroxyl groups are then reacted with trifluoromethane sulfonic anhydride (TFMSA) in the presence of pyridine and a solvent such as methylene chloride to produce Compound (IX) with triflate groups. The triflate groups are reacted with tributyl(vinyl) tin in the presence of lithium chloride, a palladium catalyst, and a solvent such as N,N-dimethyl formamide (DMF). This reaction, which is often referred to as a Stille coupling reaction, introduces the polymerizable groups as shown in Compound (X).

The polymerizable composition contains up to 25 mole percent of the crosslinker of Formula (I) based on total moles of the second monomer (i.e., mole percent crosslinker of Formula (I) is equal to [moles of crosslinker of Formula (I)÷moles of second monomer]×100). If more than 25 mole percent of the crosslinker of Formula (I) is used, the resulting polymeric material may be too highly crosslinked for many applications. For example, the resulting polymeric material may be too brittle. In some embodiments, the monomer mixtures contain up to 20 mole percent, up to 15 mole percent, up to 10 mole percent, or up to 5 mole percent of the crosslinker of Formula (I). Often, the polymerizable compositions contain at least 1 mole percent of the crosslinker of Formula (I) based on moles of second monomer in the monomer mixture. If less than 1 mole percent of the crosslinker of Formula (I) is used, the resulting polymeric material may be too easily deformed for many applications. The monomer mixture often contains at least 2 mole percent, at least 5 mole percent, or at least 10 mole percent of the crosslinker of Formula (I). In some embodiments, the monomer mixture contains an amount of the crosslinker of Formula (I) in a range of 1 to 25 mole percent, in a range of 1 to 20 mole percent, in a range of 1 to 15 mole percent, in a range of 1 to 10 mole percent, in a range of 2 to 25 mole percent, in a range of 2 to 20 mole percent, in a range of 2 to 10 mole percent, in a range of 5 to 25 mole percent, in a range of 5 to 20 mole percent, in a range of 5 to 10 mole percent, in a range of 10 to 25 mole percent, or in a range of 10 to 20 mole percent.

Stated in terms of a total weight of monomers in the monomer mixture, the polymerizable composition often contains up to 60 weight percent of the crosslinker of Formula (I). For example, the polymerizable composition can contain up to 50 weight percent, up to 40 weight percent, up to 30 weight percent, or up to 20 weight percent of the crosslinker of Formula (I). The polymerizable composition typically contains at least 1 weight percent, at least 2 weight percent, at least 5 weight percent, or at least 10 weight percent of the crosslinker of Formula (I).

In addition to the crosslinker of Formula (I), the monomer mixture includes a second monomer with a single ethylenically unsaturated group. The second monomer is usually styrene, styrene substituted with one or more alkyl groups, or a combination thereof. Suitable alkyl groups that can be used as substituents for styrene often have 1 to 20 carbon atoms, 1 to 10 carbon atoms, 1 to 6 carbon atoms, or 1 to 4 carbon atoms. Examples of styrene substituted with alkyl groups include, but are not limited to, ethyl styrene and tert-butyl styrene.

The polymerizable composition often contains 1 to 60 weight percent of the crosslinker of Formula (I) and 40 to 99 weight percent of the second monomer based on a total weight of monomers in the monomer mixture. For example, the polymerizable composition can contain 2 to 60 weight percent of the crosslinker of Formula (I) and 40 to 98 weight percent second monomer, 5 to 60 weight percent of the crosslinker of Formula (I) and 40 to 95 weight percent of the second monomer, 5 to 50 weight percent of the crosslinker of Formula (I) and 50 to 95 weight percent of the second monomer, 5 to 40 weight percent of the crosslinker of Formula (I) and 60 to 95 weight percent of the second monomer, 5 to 30 weight percent of the crosslinker of Formula (I) and 70 to 95 weight percent of the second monomer, or 5 to 20 weight percent of the crosslinker of Formula (I) and 80 to 95 weight percent of the second monomer.

In some embodiments, an additional crosslinker that is not of Formula (I) can be added to the monomer mixture. Suitable additional crosslinkers are those that have a plurality (e.g., 2 to 4) of ethylenically unsaturated groups and that are miscible with the crosslinker of Formula (I) and the second monomer in the monomer mixture. The additional crosslinker is often selected to be hydrophobic. Suitable additional crosslinkers include polyvinyl aromatic monomers. The term "polyvinyl aromatic monomer" refers to a monomer that is not of Formula (I) and that has a plurality (e.g., two or three) of vinyl groups that are each bonded to an aromatic carbocyclic group. The aromatic carbocyclic group has at least one aromatic carbocyclic ring and can have 1 to 5 optional rings that are connected to or fused to the aromatic carbocyclic ring. The additional rings can be aromatic, aliphatic, or a combination thereof. Examples of polyvinyl aromatic monomers include, but are not limited to divinylbenzene, divinylbenzene substituted with one or more alkyl groups, trivinylbenzene, and trivinylbenzenes substituted with one or more alkyl groups.

When an additional crosslinker is used in combination with the crosslinker of Formula (I) in the polymerizable compositions, the total amount of crosslinker can be up to 25 mole percent but the amount of the crosslinker of Formula (I) is at least 1 mole percent. The mole percent is based on the moles of the second monomer. In some embodiments, the polymerizable composition can contain 1 to 24 mole percent of the crosslinker of Formula (I) and 1 to 24 mole percent of the additional crosslinker. Typically, the crosslinker of Formula (I) is at least 5 percent of the total moles of crosslinker in the polymerizable composition. For example, the crosslinker of Formula (I) is at least 10 percent, at least 20 percent, at least 30 percent, at least 40 percent, at least 50 percent, at least 60 percent, at least 70 percent, at least 80 percent, at least 90 percent, or at least 95 percent of the total moles of crosslinker in the polymerizable composition.

In addition to the various monomers, the polymerizable compositions (i.e., the monomer mixture plus other reactants involved in the polymerization reaction plus any solvent that may be present) typically include an initiator for free radical polymerization reactions. Any suitable free radical initiator can be used. In some embodiments, the free radical initiator is a thermal initiator that can be activated at a temperature above room temperature. In other embodiments, the free radical initiator is a redox initiator. Suitable free radical initiators are typically selected to be miscible with the monomers included in the polymerizable composition. The free radical initiator is typically present in an amount in a range of 0.05 to 10 weight percent, in a range of 0.05 to 5 weight percent, in a range of 0.05 to 2 weight percent, in a range of 0.05 to 1 weight percent, in a range of 0.1 to 5 weight percent, in a range of 0.2 to 5 weight percent, in a range of 0.5 to 5 weight percent, in a range of 0.1 to 2 weight percent, or in a range of 0.1 to 1 weight percent. The weight percent is based on a total weight of monomer in the polymerizable composition. Both the type and amount of thermal initiator can affect the polymerization rate.

Suitable thermal initiators include organic peroxides and azo compounds. Example azo compounds include, but are not limited to, those commercially available under the trade designation VAZO from E. I. du Pont de Nemours Co. (Wilmington, Del.) such as VAZO 64 (2,2'-azobis(isobutyronitrile), which is often referred to as AIBN) and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the initiator is often in a range of 25° C. to 160° C., 30° C. to 160° C., or 40° C. to 160° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al(III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

In yet another aspect, a method of preparing a crosslinked polymeric material is provided. This method includes preparing a polymerizable composition that includes a monomer mixture, a free radical initiator, and an optional organic solvent. The method further includes subjecting the polymerizable composition to free radical polymerization to form a precursor polymeric material. The polymerization can proceed using any known polymerization processes such as bulk polymerization methods, solution polymerization methods, suspension polymerization methods, or emulsion polymerization methods. The precursor polymeric material is subsequently treated with a sulfonyl-containing compound to form the sulfonyl-containing polymeric material.

With bulk polymerization methods, little or no organic solvent is included in the polymerizable composition used to form the precursor polymeric material. With solution polymerization methods, the various monomers in the monomer mixture are dissolved in a miscible organic solvent. Suitable organic solvents include, but are not limited to, ethyl acetate, amyl acetate (n-pentyl acetate), toluene, cyclohexane, cyclohexanone and methyl ethyl ketone. Any suitable percent solids can be used in the polymerizable composition. If the percent solids are too low, however, more solvent needs to be removed from the polymerized product. Additionally, lower percent solids may adversely affect the rate of polymerization. On the other hand, if the percent solids are too high, the polymerizable composition may have an unacceptably high viscosity. The percent solids are often in a range of 0.5 to 80 weight percent, 1 to 80 weight percent, 10 to 80 weight percent, 20 to 80 weight percent, 1 to 60 weight percent, 10 to 60 weight percent, 20 to 60 weight percent, 1 to 40 weight percent, 10 to 40 weight percent, 20 to 40 weight percent, 1 to 20 weight percent, 10 to 20 weight percent, or 1 to 10 weight percent based on a total weight of the polymerizable composition.

In addition to the percent solids of the polymerizable composition, the rate of polymerization can be controlled by selection of the polymerization temperature, the initiator, and the amount of the initiator. The rate of polymerization is typically increased by increasing the temperature and/or by adding higher amounts of the initiator.

The precursor polymeric material prepared using bulk polymerization methods or solution polymerization methods is often a monolith that can be easily broken apart for washing to remove any residual monomer. The washed product can be dried to form a powder. The polymer material can also be post-cured at a high temperature. High temperature post-curing can help increase the degree of conversion of the polymerizable groups in the reaction mixture. High temperature post-curing can increase the glass transition temperature of the polymeric material, increase the resistance of the polymeric material to deformation at elevated temperatures, or both. The post-curing temperature can be greater than 100° C., greater than 130° C., or greater than 150° C. The post-curing temperature is below the decomposition temperature of the precursor polymeric material.

Alternatively, suspension polymerization methods can be used to form the crosslinked precursor polymeric material. In this type of polymerization method, an organic phase is prepared that includes the monomer mixture and the free radical initiator. Optional organic solvent that is miscible with the monomers can also be part of the organic phase. The organic phase is suspended in an aqueous phase that includes water and a suspending agent. That is, the polymerizable composition includes both an organic phase and a separate aqueous phase. The polymerizable composition is typically stirred sufficiently so that droplets of the organic phase form within the aqueous phase. As polymerization proceeds, the polymeric network grows within the suspended droplets resulting in the formation of polymeric beads.

In the suspension polymerization method, the organic phase composition usually includes the same components described above for bulk and solution polymerization methods. The same mole percent of the crosslinker monomer described above is suitable for the organic phase. The same amounts of the free radical initiator described above for use in the polymerizable composition are suitable for the organic phase.

Like the bulk polymerization methods described above, the organic phase for suspension polymerization methods often contains no organic solvent. The free radical initiator and the crosslinker are typically dissolved directly in the second monomer. If an organic solvent is present, the percent solids of the organic phase is often at least 60 weight percent, at least 70 weight percent, at least 80 weight percent, at least 90 weight percent, at least 95 weight percent, or at least 98 weight percent based on a total weight of the organic phase.

The organic phase is suspended in the aqueous phase. The volume ratio of the aqueous phase to the organic phase is typically greater than 1:1. That is, the volume of the aqueous phase exceeds the volume of the organic phase. The volume ratio of the aqueous phase:organic phase is often at least 2:1, at least 3:1, at least 4:1, or at least 5:1. Besides functioning as an inert medium for suspension of the organic phase droplets, the aqueous phase dissipates the heat generated during the polymerization reaction.

The aqueous phase for the suspension polymerization method includes a suspending agent to facilitate formation of the organic phase droplets. The suspending agent modifies the interfacial tension between the aqueous phase and the organic phase. Additionally, the suspending agent provides steric stabilization of the organic phase droplets. This steric stabilization tends to minimize or prevent the formation of agglomerated particles during the polymerization process.

The suspending agent is often a non-ionic surfactant such as cellulose polymers (e.g., methyl cellulose, carboxy methyl cellulose, carboxymethyl methyl cellulose, hydroxypropyl methyl cellulose, and hydroxybutyl methyl cellulose), gelatin, poly(vinyl alcohol), partially hydrolyzed poly (vinyl alcohol), (meth)acrylate polymers (e.g., poly (methacrylic acid), sodium poly(methacrylic acid), and ethylene maleic anhydride copolymers. Other suitable suspending agents include poly(styrene sulfonates) (e.g., sodium poly(styrene sulfonate)), talc, hydroxyapatite, barium sulfate, kaolin, magnesium carbonate, magnesium hydroxide, calcium phosphate, and aluminum hydroxide.

The amount of the suspending agent in the aqueous phase is often at least 0.05 weight percent, at least 0.1 weight percent, at least 0.2 weight percent, or at least 0.5 weight percent. The amount of suspending agent can influence the size of the polymeric beads (i.e., the use of larger amounts of suspending agent often results in the formation of smaller polymeric beads). In some embodiments, the aqueous phase contains 0.05 to 10 weight percent suspending agent. For example, the aqueous phase can contain an amount of suspending agent in a range of 0.05 to 5 weight percent, in a range of 0.1 to 10 weight percent, in a range of 0.1 to 5 weight percent, in a range of 0.1 to 3 weight percent, or in a range of 0.5 to 5 weight percent. The weight percent is based on a total weight of the aqueous phase.

The size of the polymeric bead is determined, to a large extent, by the size of the organic phase droplets. The droplet size can be affected by variables such as the rate of agitation, the temperature, the choice of suspending agent, and the amount of suspending agent. The rate of agitation, the type of suspending agent, and the amount of suspending agent can often be varied to control the aggregation or agglomeration of the resulting particles. A lack of aggregation is generally preferred. In some embodiments, the density of the aqueous phase can be selected to be approximately the same as the organic phase. Approximately matching these densities tends to result in the formation of more spherical particles as well as more uniformly sized particles.

The particles (e.g., beads) prepared using suspension polymerization methods often have an average diameter of at least 50 micrometers, at least 100 micrometers, at least 200 micrometers, at least 300 micrometers, or at least 500 micrometers. For example, the average diameter is often in a range of 50 to 5000 micrometers, in a range of 100 to 3000 micrometers, in a range of 100 to 2000 micrometers, in a range of 200 to 2000 micrometers, in a range of 500 to 2000 micrometers, or in a range of 300 to 1000 micrometers.

The crosslinked precursor polymeric materials prepared using a crosslinker of Formula (I) often have a glass transition temperature that is greater than for crosslinked polymeric materials prepared using comparable amounts of divinylbenzene (i.e., same molar ratio of crosslinker to the second monomer). The glass transition temperature is often in a range of about 1° C. to about 25° C. higher depending on the amount of the crosslinker included in the monomer mixture.

Additionally, the crosslinked precursor polymeric materials prepared using a crosslinker of Formula (I) typically are more thermally stable than crosslinked polymeric materials prepared using comparable amounts of divinylbenzene (i.e., same molar ratio of crosslinker to the second monomer). The difference in the onset temperature for significant weight loss when analyzed using thermogravimetric analysis is often in a range of about 40° C. to about 50° C. higher regardless of the amount of crosslinker included in the monomer mixture.

The crosslinked precursor polymeric materials prepared using a crosslinker of Formula (I) often compresses less under a given force within certain temperature ranges (e.g., temperatures near the glass transition temperature for the polymeric material) compared to crosslinked polymeric materials prepared using comparable amounts of divinylbenzene (i.e., same molar ratio of crosslinker to the second monomer). That is, the crosslinked precursor polymeric materials prepared using a crosslinker of Formula (I) are well suited for applications where materials with higher compression resistance would be advantageous. In particular, the precursor polymeric materials are well suited for treatment with sulfonyl-containing compounds to prepare ion exchange resins such as those used in high pressure separations. The sulfonyl-containing polymeric materials are expected to withstand the pressures typically encountered in high pressure chromatographic columns.

The precursor polymeric material is subsequently treated with a sulfonyl-containing compound. This reaction results in the addition of a sulfonyl-containing group of formula —$SO_2R^5$ to the precursor polymeric material and the formation of a sulfonyl-containing polymeric material. The sulfonyl-containing group typically replaces a hydrogen atom that is bonded to a carbon atom that is part of an aromatic ring of the precursor polymer. For example, the sulfonyl-containing group often replaces a $R^1$ group that is equal to hydrogen in the precursor polymer. Alternatively or additionally, the sulfonyl-containing group can replace a hydrogen atom that is bonded to a carbon atom in any aryl group, in the aryl portion of any aralkyl group, or in the aryl portion of any alkaryl group in the precursor polymeric material. Further, the sulfonyl-containing group can be added to a double bond in the precursor polymeric material where groups $R^3$ and $R^4$ combine to form a carbon-carbon double bond. At least one aromatic ring in the sulfonyl-containing polymeric material contains a sulfonyl-containing group. Typically, the sulfonyl-containing polymeric material has a maximum number of sulfonyl-containing groups equal to the total number of aromatic rings. There are usually no more than one sulfonyl-containing groups per aromatic ring in the sulfonyl-containing polymeric material.

The sulfonyl-containing group is of formula —$SO_2R^5$, where the group $R^5$ is —OH, —$NH_2$, or —$NR^6$-Q-N$(R^6)_2$. Any of these $R^5$ can be in the form of a salt depending on the pH conditions. Suitable cations for salts include, but are not limited to, alkali metals, alkaline earth metals, ammonium ions, or tetraalkylammonium ions. Suitable anions for salts include, but are not limited to, halides, sulfates, phosphates, nitrates, and carboxylates (e.g., acetate).

In some embodiments, the sulfonyl-containing group is of formula —$SO_2OH$ or a salt of the conjugate base (the anion is —$SO_3^{-1}$). In other embodiments, the sulfonyl-containing group is of formula —$SO_2NH_2$ or a salt of the conjugate acid (the cation is —$SO_2NH_3^{+1}$). In still other embodiments, the sulfonyl-containing group is of formula —$SO_2NR^6$-Q-N$(R^6)_2$ or the salt of the conjugate acid. Each group $R^6$ is independently hydrogen or alkyl. Suitable $R^6$ alkyl groups often have 1 to 10 carbon atoms, 1 to 6 carbon atoms, 1 to 4 carbon atoms, or 1 to 3 carbon atoms. In many examples, $R^6$ alkyl groups are methyl or ethyl. The group Q is a single bond, alkylene, or a group of formula -$(Q^1$-$NR^6)_x$-$Q^2$- where each $Q^1$ and $Q^2$ is independently an alkylene and where x is an integer in a range of 1 to 4. Suitable alkylene groups for Q, $Q^1$, and $Q^2$ often have 1 to 10 carbon atoms, 1 to 6 carbon atoms, 1 to 4 carbon atoms, or 1 to 3 carbon atoms. If Q is a single bond, the sulfonyl group has a hydrazinyl group (i.e., —$NR^6$—N$(R^6)_2$, which is often —NH—$NH_2$). The variable x in the formula -$(Q^1$-$NR^6)_x$-$Q^2$- is usually an integer in a range of 1 to 4, 1 to 3, or 1 to 2.

Any known method can be used to introduce the sulfonyl-containing group into the precursor polymeric material. That is, the precursor can be reacted with any known sulfonyl-containing compound. The formation of the specific —$SO_2R^5$ group often includes reacting the precursor with a sulfonyl-containing compound and then further reacting the intermediate polymeric material with another compound such as water, ammonia, ammonium hydroxide, a polylamine, or hydrazine. The term "polyamine" refers to a compound having at least two amino groups of formula —$N(R^6)_2$ where $R^6$ is the same as defined above. The polyamine is often of formula NH$(R^6)$-Q-N$(R^6)$.

In some embodiments, the precursor polymeric material is reacted with a halogenated sulfonic acid (e.g., chlorosulfonic acid) as the sulfonyl-containing compound. The precursor polymeric material is mixed with a solution of the halogenated sulfonic acid dissolved in an appropriate organic solvent. Suitable organic solvents include various halogenated solvents such as 1,2-dichloroethane, methylene chloride, and chloroform. The solution of the halogenated sulfonic acid is often added to the precursor polymeric material at a temperature below room temperature such as, for example, at about 0° C. The initial reaction can be quite exothermic so, if adequate care is not taken, the solvent can boil during the addition. After the reactants are combined, the temperature is often increased to any desired temperature such as room temperature up to the temperature associated with reflux conditions. The reaction time can range from a few minutes to 24 hours. The reaction time and the reaction temperature can be varied to prepare polymeric materials with different amounts of the sulfonyl-containing group. After this reaction, the sulfonyl-containing polymeric material has attached —$SO_2X$ groups where X is halo such as chloro. These groups are typically reacted further to provide a group of formula —$SO_2R^5$. To prepare the group —$SO_2OH$, the intermediate polymeric material with attached —$SO_2X$ group is placed in water. The conversion of the —$SO_2X$ groups to —$SO_2OH$ groups often can occur at room temperature within 30 minutes, within 1 hour, within 2 hours, within 4 hours, within 8 hours, within 12 hours, within 24 hours, within 36 hours, within 48 hours, within 60 hours, or within 72 hours.

In other embodiments, the precursor polymeric material is reacted with concentrated sulfuric acid or with concentrated sulfuric acid in the presence of a catalyst such as silver sulfate. When a catalyst is present, the reaction typically proceeds faster. With or without the catalyst, the reaction temperature is often in a range of room temperature (e.g., 20-25° C.) to 150° C., in a range of room temperature to 125° C., or in a range of room temperature to 100° C. The reaction times can vary from a few minutes (e.g., 5 minutes, 10 minutes, or 30 minutes) to 24 hours or longer. As with halogenated sulfonic acid, the reaction time and the reaction temperature can be varied to prepare polymeric materials with different amounts of the sulfonyl-containing group. After this reaction, the sulfonyl containing polymeric material has attached —$SO_2OH$ groups.

Typically, it is desirable to introduce as many sulfonyl-containing groups as possible into the precursor polymeric material. An excess of the sulfonyl-containing compound is used. That is, the moles of sulfonyl-containing compound can be up to 10 times the number of moles of aromatic rings in the precursor polymeric material. If it is desirable to have fewer sulfonyl-containing groups, the moles of sulfonyl-containing compound can be lowered, the reaction time can be shortened, or the reaction temperature can be lowered. For example, in some embodiments, there is not a sulfonyl group on each aromatic ring and the molar ratio of sulfonyl-containing compound to aromatic rings is less than 1.

To prepare —SO$_2$NH$_2$ groups, a sulfonyl-containing intermediate polymeric material having —SO$_2$X groups (prepared using a halogenated sulfonic acid as described above) can be treated with ammonia gas or ammonium hydroxide. To maximize conversion of the —SO$_2$X groups to —SO$_2$NH$_2$ groups, the moles of ammonia or ammonium hydroxide are often as much as 10 times the number of moles of —SO$_2$X groups. This reaction typically often occurs at room temperature within 30 minutes, within 1 hour, within 2 hours, within 4 hours, within 8 hours, within 12 hours, within 24 hours, within 36 hours, within 48 hours, within 60 hours, or within 72 hours. The reaction temperature is often in a range from room temperature to the temperature associated with reflux conditions.

To prepare —SO$_2$NH—NH$_2$ groups, a sulfonyl-containing intermediate polymeric material having —SO$_2$X groups (prepared using a halogenated sulfonic acid as described above) can be treated with hydrazine. Either hydrazine monohydrate or anhydrous hydrazine can be dissolved in an organic solvent. To maximize conversion of the —SO$_2$X groups to —SO$_2$NH—NH$_2$ groups, the moles of hydrazine are often as much as 10 times the number of moles of —SO$_2$X groups. This reaction typically often occurs at room temperature within 30 minutes, within 1 hour, within 2 hours, within 4 hours, within 8 hours, within 12 hours, within 24 hours, within 36 hours, within 48 hours, within 60 hours, or within 72 hours. The reaction temperature is often in a range from room temperature to the temperature associated with reflux conditions. Anhydrous conditions or organic solvents are often selected in place of water to minimize the preparation of —SO$_2$OH groups.

To prepare —SO$_2$NR$^6$-Q-N(R$^6$)$_2$ where Q is a group of formula -(Q$^1$-NR$^6$)$_x$-Q$^2$-, a sulfonyl-containing intermediate polymeric material having —SO$_2$X groups (prepared using a halogenated sulfonic acid as described above) can be treated with an amino-containing compounds of formula (R$^6$)HN-Q-N(R$^6$)$_2$ (e.g., (R$^6$)HN-(Q$^1$-NR$^6$)$_x$-Q$^2$-N(R$^6$)$_2$). Suitable examples of these compounds include, but are not limited to, ethylene diamine, diethylenetriamine, triethylenetetramine, tetraethylenepentamine, and the like. To maximize conversion of the —SO$_2$X groups to —SO$_2$NR$^6$-Q-N(R$^6$)$_2$ groups, the moles of reactive amino-containing groups are often at much as 10 times the number of moles of —SO$_2$X groups. This reaction typically often occurs at room temperature within 30 minutes, within 1 hour, within 2 hours, within 4 hours, within 8 hours, within 12 hours, within 24 hours, within 36 hours, within 48 hours, within 60 hours, or within 72 hours. The reaction temperature is often in a range from room temperature to the temperature associated with reflux conditions. Anhydrous conditions or organic solvents are often selected in place of water to minimize the preparation of —SO$_2$OH groups.

The sulfonyl-containing polymeric material typically contains at least 0.2 milliequivalents of —SO$_2$R$^5$ per gram. In some embodiments, the amount of —SO$_2$R$^5$ is in a range of 0.2 to 5 milliequivalents per gram, in a range of 0.2 to 4.5 milliequivalents per gram, in a range of 0.5 to 4.1 milliequivalents per gram, in a range of 1 to 4 milliequivalents per gram, in a range of 2 to 4 milliequivalents per gram, or in a range of 3 to 4 milliequivalents per gram of the sulfonyl-containing polymeric material. Any suitable method can be used to determine the milliequivalents per gram. In one preferred method, the total sulfur content of the sulfonyl-containing polymeric material is determined by elemental analysis.

In some embodiments, the sulfonyl-containing polymeric material has —SO$_2$OH groups or a salt thereof and can be used as an ion exchange resin for the separation or concentration of positively charged materials or ions. That is, the sulfonyl-containing polymeric material functions as a cation exchange resin. Positively charged materials tend to be retained longer by the sulfonyl-containing polymeric material than neutral materials or negatively charged materials or ions. Further, positively charged materials or ions with a greater positive charge (e.g., calcium ions) tend to be retained longer by the sulfonyl-containing polymeric material than positively charged materials or ions with a lower positive charge (e.g., sodium ions). In some embodiments, the pH conditions during separation are selected so that the sulfonyl-containing polymeric material is negatively charged.

In other embodiments, the sulfonyl-containing polymeric material has —SO$_2$NH$_2$ or —SO$_2$NR$^6$-Q-N(R$^6$)$_2$ groups or a salt thereof and can be used as an ion exchange resin for the separation or concentration of negatively charged materials or ions. That is, the sulfonyl-containing polymeric material functions as an anion exchange resin. Negatively charged materials tend to be retained longer by the sulfonyl-containing polymeric material than neutral materials or positively charged materials or ions. Further, negatively charged materials or ions with a greater negative charge (e.g., phosphate ions) tend to be retained longer by the sulfonyl-containing polymeric material than negatively charged materials or ions with lower negative charge (e.g., nitrate ions). In some embodiments, the pH conditions during separation are selected so that the sulfonyl-containing polymeric material is positively charged.

The ion exchange resins can be placed within a chromatographic column. Alternatively, the ion exchange resin can be distributed on the surface of a porous substrate, distributed throughout a porous substrate, or both. The porous substrate can be, for example, a filtration medium or any other porous matrix.

Various embodiments are provided of sulfonyl-containing polymeric materials and methods of making the sulfonyl-containing polymeric materials.

Embodiment 1 is a sulfonyl-containing polymeric material that includes a reaction product of a reaction mixture containing a) a precursor polymeric material and b) a sulfonyl-containing compound. The precursor material includes the polymerized product of a polymerizable composition containing i) a monomer mixture and ii) a free radical initiator. The monomer mixture contains 1) a first monomer of Formula (I)

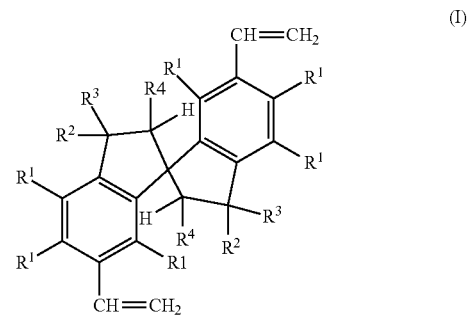

and 2) a second monomer that is styrene, styrene substituted with one or more alkyl groups, or a combination thereof, wherein the first monomer of Formula (I) is present in an amount up to 25 mole percent based on moles of the second monomer. In the monomer of Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond. The sulfonyl-containing polymeric material has at least one group of formula —$SO_2R^5$ and up to a maximum of one group of formula —$SO_2R^5$ for each aromatic ring in the sulfonyl-containing polymeric material. The group $R^5$ is —OH, —$NH_2$, or —$NR^6$-Q-N$(R^6)_2$. The group Q is a single bond, alkylene, or a group of formula -$(Q^1$-$NR^6)_x$-$Q^2$- where each $Q^1$ and $Q^2$ is independently an alkylene and where x is an integer in a range of 1 to 4. Each group $R^6$ is independently hydrogen or alkyl.

Embodiment 2 is the sulfonyl-containing polymeric material of embodiment 1, wherein each $R^1$ of the first monomer is hydrogen or halo.

Embodiment 3 is the sulfonyl-containing polymeric material of embodiment 1 or 2, wherein each $R^2$ and each $R^3$ of the first monomer are alkyl.

Embodiment 4 is the sulfonyl-containing polymeric material of any one of embodiments 1 to 3, wherein $R^4$ of the first monomer is hydrogen.

Embodiment 5 is the sulfonyl-containing polymeric material of any one of embodiments 1 to 4, wherein the first monomer is 3,3,3',3'-tetramethyl-1,1'-spirobisindan-6,6'-divinyl.

Embodiment 6 is the sulfonyl-containing polymeric material of any one of embodiments 1 to 5, wherein the monomer mixture comprises 1 to 25 mole percent of the first monomer of Formula (I).

Embodiment 7 is the sulfonyl-containing polymeric material of any one of embodiments 1 to 6, wherein the monomer mixture further comprises a polyvinyl aromatic monomer that is not of Formula (I).

Embodiment 8 is the sulfonyl-containing polymeric material of any one of embodiments 1 to 7, wherein the sulfonyl-containing polymer is in a form of particles or beads.

Embodiment 9 is the sulfonyl-containing polymeric material of any one of embodiments 1 to 8, wherein the sulfonyl-containing group is —$SO_2OH$ or a salt thereof.

Embodiment 10 is the sulfonyl-containing polymeric material of embodiment 9, wherein the sulfonyl-containing polymeric material is a cation exchange resin.

Embodiment 11 is the sulfonyl-containing polymeric material of any one of embodiments 1 to 8, wherein the sulfonyl-containing group is —$SO_2NH_2$, —$SO_2NR^6$-Q-N$(R^6)_2$, or a salt thereof.

Embodiment 12 is the sulfonyl-containing polymeric material of embodiment 11, wherein the sulfonyl-containing polymeric material is an anion exchange resin.

Embodiment 13 is a method of making a sulfonyl-containing polymeric material. The method includes preparing a polymerizable composition containing a) a monomer mixture and b) a free radical initiator. The monomer mixture contains i) a first monomer of Formula (I) and ii) a second monomer that is styrene, styrene substituted with one or more alkyl groups, or a combination thereof. The first monomer of Formula (I) is the same as described above and is present in an amount up to 25 mole percent based on moles of the second monomer. The method further includes forming a precursor polymeric material by reacting the polymerizable composition and then treating the precursor polymeric material with a sulfonyl-containing compound to form a sulfonyl-containing polymeric material. The sulfonyl-containing polymeric material has at least one group of formula —$SO_2R^5$ and up to a maximum of one group of formula —$SO_2R^5$ for each aromatic ring in the sulfonyl-containing polymeric material. The group $R^5$ is the same as defined above.

Embodiment 14 is the method of embodiment 11, wherein the polymerizable composition comprises (1) an organic phase comprising the monomer mixture and the free radical initiator and (2) an aqueous phase comprising water and a suspending agent, wherein the organic phase is suspended as droplets within the aqueous phase and wherein the sulfonyl-containing polymeric material is in a form of particles or beads.

Embodiment 15 is the method of embodiment 13 or 14, wherein each $R^1$ of the first monomer is hydrogen or halo.

Embodiment 16 is the method of any one of embodiments 13 to 15, wherein each $R^2$ and each $R^3$ of the first monomer are alkyl.

Embodiment 17 is the method of any one of embodiments 13 to 16, wherein $R^4$ of the first monomer is hydrogen.

Embodiment 18 is the method of any one of embodiments 13 to 17, wherein the first monomer is 3,3,3',3'-tetramethyl-1,1'-spirobisindan-6,6'-divinyl.

Embodiment 19 is the method of any one of embodiments 13 to 18, wherein the monomer mixture comprises 1 to 25 mole percent of the first monomer of Formula (I).

Embodiment 20 is the method of any one of embodiments 13 to 19, wherein the monomer mixture further comprises a polyvinyl aromatic monomer that is not of Formula (I).

Embodiment 21 is the method of any one of embodiments 13 to 20, wherein the sulfonyl-containing group is —$SO_2OH$ or a salt thereof.

Embodiment 22 is the method of embodiment 21, wherein the sulfonyl-containing polymeric material is a cation exchange resin.

Embodiment 23 is the method of any one of embodiments 13 to 20, wherein the sulfonyl-containing group is —$SO_2NH_2$, —$SO_2NR^6$-Q-N$(R^6)_2$, or a salt thereof.

Embodiment 24 is the method of embodiment 23, wherein the sulfonyl-containing polymeric material is an anion exchange resin.

Embodiment 25 is an ion exchange resin comprising the sulfonyl-containing polymeric material of embodiment 1.

Embodiment 26 is the ion exchange resin of embodiment 25, wherein the ion exchange resin is in a form of beads or particles.

Embodiment 27 is the ion exchange resin of embodiment 25 or 26, wherein the sulfonyl-containing group is —$SO_2OH$ or a salt thereof.

Embodiment 28 is the ion exchange resin of embodiment 25 or 26, wherein the sulfonyl-containing group is —$SO_2NH_2$, —$SO_2NR^6$-Q-N$(R^6)_2$, or a salt thereof.

Embodiment 29 is an article comprising a chromatographic column and the ion exchange resin of any one of embodiment 25 to 28 positioned within the chromatographic column.

Embodiment 30 is an article comprising a porous substrate and the ion exchange resin of any one of embodiments 25 to 29 positioned on a surface of the porous substrate, distributed throughout the porous substrate, or a combination thereof.

EXAMPLES

TABLE 1

Glossary of materials

| Chemical Name | Chemical Supplier |
|---|---|
| 4,4'-Isopropylidene diphenol | Alfa Aesar, Ward Hill. MA |
| Methane sulfonic acid | Alfa Aesar, Ward Hill. MA |
| Methylene chloride | EMD Millipore Chemicals, Billerica, MA |
| Methanol | BDH Merck Ltd., Poole Dorset, UK |
| Pyridine | EM Science, Gibbstown, NJ |
| Trifluoromethane sulfonic acid | Oakwood Products, West Columbia, SC |
| Concentrated hydrogen chloride | EMD Millipore Chemicals, Billerica, MA |
| Sodium bicarbonate | J. T. Baker, Phillipsburg, NJ |
| Sodium sulfate | BDH Merck Ltd., Poole Dorset, UK |
| N,N-Dimethyl formamide | Sigma-Aldrich, Milwaukee, WI |
| Tributyl(vinyl)tin | Sigma-Aldrich, Milwaukee, WI |
| Lithium chloride | Mallinckrodt, St. Louis, MO |
| Bis(triphenylphosphine)palladium (II) chloride | Sigma-Aldrich, Milwaukee, WI |
| Diethyl ether | EMD Millipore Chemicals, Billerica, MA |
| Potassium fluoride | J. T. Baker, Phillipsburg, NJ |
| Ethyl acetate | EMD Millipore Chemicals, Billerica, MA |
| Petroleum ether | EMD Millipore Chemicals, Billerica, MA |
| Benzoyl peroxide | Sigma-Aldrich, Milwaukee, WI |
| Acetone-D6 | Cambridge Isotope Laboratories, Inc., Andover, MA |
| Chloroform-D | Cambridge Isotope Laboratories, Inc., Andover, MA |
| Silver sulfate | Alfa Aesar, Ward Hill. MA |
| Concentrated sulfuric acid | EMD Millipore Chemicals, Billerica, MA |
| Phenolphthalein | Sigma-Aldrich, Milwaukee, WI |
| Sodium hydroxide | EMD Millipore Chemicals, Billerica, MA |

Synthesis of 3,3,3',3'-tetramethyl-1,1'-spirobisindan-6,6'-diol (SBI-diol)

In a 5.0 L round bottomed flask, 1000.69 grams (4.38 moles) of 4,4'-isopropylidene diphenol (BPA) was melted. Once all of the BPA was melted, 50.51 grams (0.526 moles) of methane sulfonic acid was slowly added. The reaction mixture was stirred for 3 hours under a nitrogen atmosphere maintaining the temperature of the reaction mixture between 135-150° C. After 3 hours, while still hot, the molten reaction mixture was poured into 2.0 L of deionized water. A brown precipitate formed. The resulting precipitate was isolated by vacuum filtration and washed with 1.5 L of deionized water. The isolated solid was then put back in the 5.0 L round bottomed flask and 1.5 L of methylene chloride ($CH_2Cl_2$) was added. The solid was stirred in the $CH_2Cl_2$ at reflux for one hour. The flask was then allowed to cool to room temperature, and the flask was placed in a refrigerator (about 0° C.) overnight. The solid was then isolated by vacuum filtration and washed with a minimal amount (about 500 mL) of chilled $CH_2Cl_2$. The solid was then placed in a 4.0 L Erlenmeyer flask and dissolved in 900 mL of methanol (MeOH). To this solution was added 190 mL of $CH_2Cl_2$. The solution remained clear. The solution was stirred and 1.1 L of deionized water was added in portions. A white precipitate formed, and the mixture was placed in a refrigerator (about 0° C.) overnight. The solid was isolated by vacuum filtration and washed with a minimal amount (about 300 mL) of chilled $CH_2Cl_2$. The MeOH/$CH_2Cl_2$/$H_2O$ precipitation was repeated once more. The solid from the second precipitation was dried in a vacuum oven at 85° C. overnight to yield 214.77 grams (48% yield) of SBI-diol. $^1H$ NMR (500 MHz, acetone-$d_6$) δ 7.85 (s, 2H), 7.02 (d, J=8.1 Hz, 2H), 6.68 (dd, J=8.1, 2.4 Hz, 2H), 6.19 (d, J=2.4 Hz, 2H), 2.32 (d, J=13.0 Hz, 2H), 2.19 (d, J=13.0 Hz, 2H), 1.35 (s, 6H), 1.29 (s, 6H).

Synthesis of perfluoromethane-1-sulfonic Acid 6'-(perfluoromethane-1-sulfonyloxy)-3,3,3',3'-tetramethyl-1,1'-spirobisindane-6-yl Ester (SBI-bistriflate)

In a 250 mL round bottomed flask, 5.0025 grams (16.2 mmoles) of SBI-diol and 4.755 mL (47.1 mmoles) of pyridine were dissolved in 150 mL of $CH_2Cl_2$. The flask was placed in an ice/water bath. To this solution was added dropwise 7.930 mL (58.8 mmoles) of trifluoromethane sulfonic anhydride (TFMSA). After the addition was complete, the flask was removed from the ice/water bath. The reaction mixture was stirred at room temperature under a nitrogen atmosphere for 1 hour. The reaction was stopped by adding 10 mL of aqueous hydrogen chloride (HCl) (10% by weight). The resulting mixture was partitioned between $CH_2Cl_2$ and a saturated aqueous solution of sodium bicarbonate ($NaHCO_3$). The organic layer was isolated, dried over anhydrous sodium sulfate ($Na_2SO_4$) and filtered. The filtrate was condensed under reduced pressure and dried under high vacuum at room temperature for 3 hours to remove any residual pyridine. The resulting tan solid (SBI-bistriflate) weighed 8.51 grams (92% yield). $^1H$ NMR (500 MHz, $CDCl_3$) δ 7.17 (d, J=8.3 Hz, 2H), 7.08 (dd, J=8.3, 2.3 Hz, 2H), 6.55 (d, J=2.3 Hz, 2H), 2.26 (ABq, J=13.2 Hz, 4H), 1.34 (s, 6H), 1.29 (s, 6H). $^{19}F$ NMR (470.5 MHz, $CDCl_3$) δ −73.0.

Synthesis of 3,3,3',3'-tetramethyl-1,1'-spirobisindan-6,6'-divinyl (SBI-DV)

In a 250 mL round bottomed flask, 5.0025 grams (8.74 mmoles) of SBI-bistriflate) was dissolved in 75 mL of anhydrous N,N-dimethyl formamide (DMF). To this solution was added 6.125 mL (21.0 mmoles) of vinyl tributyltin and 22.2225 grams (52.4 mmoles) of lithium chloride (LiCl). The reaction mixture was stirred at room temperature under a nitrogen atmosphere for 5 minutes before adding 0.6140 grams (875 µmoles) of bis(triphenylphosphine)palladium (II) chloride. The reaction mixture was stirred at room temperature overnight under a nitrogen atmosphere. After reacting for 24 hours at room temperature, the reaction was stopped by pouring the reaction mixture into 150 mL of deionized water. A precipitate formed. The aqueous layer and precipitate were extracted with diethyl ether ($Et_2O$) (3×200 mL). The organic layers were combined. The organic layer was then stirred vigorously at room temperature with an equal volume of aqueous potassium fluoride (KF) (10 grams/100 mL) for 1 hour. A gray-white precipitate formed and the mixture was vacuum filtered. The filtrate was then placed back in a separatory funnel and the organic layer isolated. The organic layer was then dried over anhydrous $Na_2SO_4$, filtered and the filtrate was condensed under reduced pressure to yield a white solid. This solid was further purified by silica gel chromatography. The material was loaded onto a silica gel column (8×25 cm), and the column was eluted with 5% ethyl acetate (EtOAc)/95% petroleum ether (PE) (vol./vol.). Fractions containing the pure SBI-DV were combined, condensed under reduced pressure and dried under high vacuum at room temperature to yield 2.3822 grams (83% yield) of SBI-DV as a white solid. $^1$H NMR (500 MHz, $CDCl_3$) δ 7.34 (dd, J=7.9, 1.6 Hz, 2H), 7.17 (d, J=7.9 Hz, 2H), 6.85 (d, J=1.6 Hz, 2H), 6.64 (dd, J=17.6, 10.9 Hz, 2H), 5.62 (dd, J=17.6, 1.0 Hz, 2H), 5.12 (dd, J=10.9, 1.0 Hz, 2H), 2.32 (ABq, J=13.1 Hz, 4H), 1.42 (s, 6H), 1.36 (s, 6H).

Example 1

In an 8 mL vial, 0.791 grams (7.59 mmoles) of styrene and 0.250 grams (761 µmoles) of SBI-DV were dissolved in 0.789 grams of EtOAc. To this solution was added 16.0 milligrams (66.1 µmoles) of benzoyl peroxide (BPO). The polymerization mixture thus consisted of an EtOAc solution of a 10.0:1 molar ratio of styrene: SBI-DV at 57 percent solids and 1.5 weight percent BPO. The polymerization mixture was bubbled with nitrogen for 10 minutes. The vial was then capped and placed in a sand bath at 90° C. The polymerization was heated at this elevated temperature for 18 hours. A clear solid had formed and was isolated by vacuum filtration and washed with EtOAc. The solid was placed in a 20 mL vial and 10 mL of EtOAc was added to the vial. The material was left sitting in the EtOAc for 30 minutes. The solid was again isolated by vacuum filtration and washed with EtOAc. The solid was placed in a 20 mL vial and 10 mL of EtOAc was added to the vial. The material was left sitting in the EtOAc overnight. The solid was again isolated by vacuum filtration and washed with EtOAc. The solid was then dried under high vacuum at 100° C. overnight.

The resulting SBI-DV crosslinked polystyrene was sulfonated. The functionalization was accomplished by placing 0.400 grams of the SBI-DV crosslinked polystyrene in a 20 mL vial containing 8.0 milligrams of silver sulfate dissolved in 6 mL of concentrated sulfuric acid. The vial was capped and placed in a sand bath at 90° C. The reaction mixture was heated at this elevated temperature for 18 hours. The reaction mixture was poured into 50 mL of 6 M aqueous sulfuric acid. The solid was isolated by vacuum filtration and the resulting solid was washed with 300 mL of deionized water. The solid was then dried under high vacuum at 100° C. overnight.

The cationic exchange capacity of the sulfonated SBI-DV crosslinked polystyrene was determined by liquid titration to be 3.73 mmoles/gram. This material was also analyzed by elemental analysis which based on the percent by weight sulfur content showed this material to have cationic exchange capacity of 3.83 mmoles/gram.

Procedure for Determination of Cationic Exchange Capacity by Liquid Titration:

The sulfonyl-containing polymeric material (about 0.200 grams) was suspended in 20 mL of deionized water. To this suspension was added 1 drop of a 1 percent by weight aqueous solution of phenolphthalein. This suspension was titrated with 0.1 M aqueous NaOH until a persistent pink color remained (phenolphthalein endpoint). The cationic exchange capacity was calculated based on the amount of NaOH needed to reach the titration endpoint.

Elemental Analysis:

Samples were analyzed for weight percent carbon, hydrogen, nitrogen and sulfur by combustion using a LECO TruSpec Micro CHNS elemental analyzer (LECO Corp, St. Joseph, Mich.). The samples were run in triplicate or better. Results are reported as the averages of replicate determinations. In order to eliminate ambient water from the analysis, aliquots of each sample were dried on a steam-plate under nitrogen for 2 hours and allowed to cool in a nitrogen purged dry-box for 30 minutes before weighing. The samples were placed in silver capsules and crimped and placed on the auto-sampler in ambient conditions.

The LECO TruSpec Micro CHNS instrument was calibrated by first base-lining the instrument with ambient air until the CHNS detectors are stabilized. Next, 3-4 empty crucibles were measured and set as instrument blanks. Finally, a calibration curve was generated with sulfamethazine as a standard. Based on this procedure the standard deviation for each element was: less than +/−0.5 weight percent for carbon, less than +/−0.3 weight percent for hydrogen, less than +/−0.3 weight percent for nitrogen and less than +/−0.3 weight percent for sulfur.

I claim:

1. A sulfonyl-containing polymeric material comprising a reaction product of a reaction mixture comprising:
   a) a precursor polymeric material comprising a polymerized product of a polymerizable composition comprising
      i) a monomer mixture comprising
         1) a monomer of Formula (I)

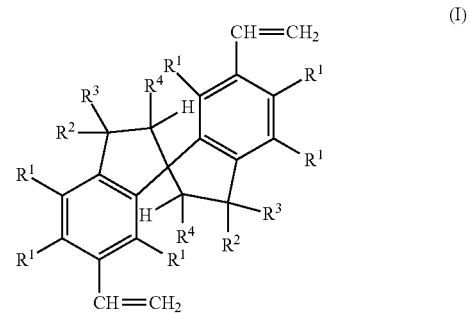

wherein
   each $R^1$ is hydrogen, halo, alkyl, aryl, alkaryl, or aralkyl, wherein at least one $R^1$ is hydrogen;
   each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings;
   each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon double bond; and each $R^4$ is independently hydrogen or combines with $R^3$ connected to the adjacent carbon atom to form a carbon-carbon double bond;

2) a second monomer that is styrene, styrene substituted with one or more alkyl groups, or a combination thereof, wherein the first monomer of Formula (I) is present in an amount up to 25 mole percent based on moles of the second monomer; and ii) a free radical initiator; and b) a sulfonyl-containing compound, wherein the sulfonyl-containing polymeric material having at least one sulfonyl-containing group of formula —$SO_2R^5$ and up to a maximum of one group of formula —$SO_2R^5$ for each aromatic ring in the sulfonyl-containing polymeric material;

$R^5$ is —OH, —$NH_2$, or —$NR^6$-Q-N$(R^6)_2$;

each $R^6$ is independently hydrogen or alkyl;

Q is a single bond, alkylene, or a group of formula -$(Q^1$-$NR^6)_x$-$Q^2$-;

each $Q^1$ is an alkylene;

$Q^2$ is an alkylene; and x is an integer in a range of 1 to 4.

2. The sulfonyl-containing polymeric material of claim 1, wherein each $R^1$ of the first monomer is hydrogen or halo.

3. The sulfonyl-containing polymeric material of claim 1, wherein each $R^2$ and each $R^3$ of the first monomer are alkyl.

4. The sulfonyl-containing polymeric material of claim 1, wherein $R^4$ of the first monomer is hydrogen.

5. The sulfonyl-containing polymeric material of claim 1, wherein the first monomer is 3,3,3',3'-tetramethyl-1,1'-spirobisindan-6,6'-divinyl.

6. The sulfonyl-containing polymeric material of claim 1, wherein the monomer mixture comprises 1 to 25 mole percent of the first monomer of Formula (I).

7. The sulfonyl-containing polymeric material of claim 1, wherein the monomer mixture further comprises a polyvinyl aromatic monomer that is not of Formula (I).

8. The sulfonyl-containing polymeric material of claim 1, wherein the sulfonyl-containing polymer is in a form of particles or beads.

9. The sulfonyl-containing polymeric material of claim 1, wherein the sulfonyl-containing group is —$SO_2OH$ or a salt thereof.

10. The sulfonyl-containing polymeric material of claim 9, wherein the sulfonyl-containing polymeric material is a cation exchange resin.

11. The sulfonyl-containing polymeric material of claim 1, wherein the sulfonyl-containing group is —$SO_2NH_2$, —$SO_2NR^6$-Q-N$(R^6)_2$, or a salt thereof.

12. The sulfonyl-containing polymeric material of claim 11, wherein the sulfonyl-containing polymeric material is an anion exchange resin.

13. A method of preparing a sulfonyl-containing polymeric material, the method comprising:

preparing a polymerizable composition comprising
a) a monomer mixture comprising
i) a first monomer of Formula (I)

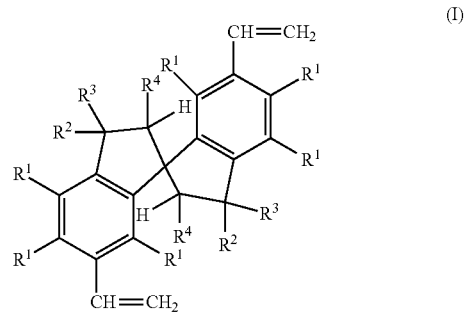

wherein
each $R^1$ is hydrogen, halo, alkyl, aryl, alkaryl, or aralkyl, wherein at least one $R^1$ is hydrogen;
each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings;
each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon double bond; and
each $R^4$ is independently hydrogen or combines with $R^3$ connected to the adjacent carbon atom to form a carbon-carbon double bond;

ii) a second monomer that is styrene, styrene substituted with one or more alkyl groups, or a combination thereof wherein the first monomer of Formula (I) is present in an amount up to 25 mole percent based on moles of the second monomer; and b) a free radical initiator; and forming a precursor polymeric material by reacting the polymerizable composition; and treating the precursor polymeric material with a sulfonyl-containing compound to form the sulfonyl-containing polymeric material, wherein the sulfonyl-containing polymeric material having at least one sulfonyl-containing group of formula —$SO_2R^5$ and up to a maximum of one group of formula —$SO_2R^5$ for each aromatic ring in the sulfonyl-containing polymeric material;

$R^5$ is —OH, —$NH_2$, or —$NR^6$-Q-N$(R^6)_2$;

each $R^6$ is independently hydrogen or alkyl;

Q is a single bond, alkylene, or a group of formula -$(Q^1$-$NR^6)_x$-$Q^2$-;

each $Q^1$ is an alkylene;

$Q^2$ is an alkylene; and x is an integer in a range of 1 to 4.

14. The method of claim 13, wherein the polymerizable composition comprises (1) an organic phase comprising the monomer mixture and the free radical initiator and (2) an aqueous phase comprising water and a suspending agent, wherein the organic phase is suspended as droplets within the aqueous phase and wherein the sulfonyl-containing polymeric material is in a form of particles or beads.

* * * * *